United States Patent [19]
Casanave et al.

[11] Patent Number: 5,961,933
[45] Date of Patent: Oct. 5, 1999

[54] PROCESS AND APPARATUS FOR OPERATION OF A SLURRY BUBBLE COLUMN WITH APPLICATION TO THE FISCHER-TROPSCH SYNTHESIS

[75] Inventors: Dominique Casanave, Villeurbanne; Pierre Galtier, Vienne; Jean-Charles Viltard, Marly le Roi, all of France

[73] Assignee: Institut Francais Du Petrole, France

[21] Appl. No.: 08/901,521

[22] Filed: Jul. 28, 1997

[30] Foreign Application Priority Data

Jul. 26, 1997 [FR] France .................................. 96 09552

[51] Int. Cl.$^6$ .................................. B01J 8/02; B01J 8/08; B01J 8/00; F28D 7/00
[52] U.S. Cl. .......................... 422/211; 422/234; 422/235; 422/232; 422/231; 422/139; 518/700
[58] Field of Search .................................. 422/211, 234, 422/235, 232, 231, 139; 518/700

[56] References Cited

U.S. PATENT DOCUMENTS

| | | |
|---|---|---|
| 3,754,993 | 8/1973 | Oguchi et al. .......................... 134/25 R |
| 3,759,669 | 9/1973 | Aaron et al. .............................. 422/211 |
| 3,901,660 | 8/1975 | Ohorodnik et al. ....................... 23/288 |
| 4,139,352 | 2/1979 | McEwan et al. .......................... 55/159 |
| 4,589,927 | 5/1986 | Allen et al. .............................. 134/25 |
| 5,527,473 | 6/1996 | Ackerman ............................... 518/700 |

*Primary Examiner*—Paul J. Killos
*Assistant Examiner*—Jafar Parsa
*Attorney, Agent, or Firm*—Millen, White, Zelano & Branigan, P.C.

[57] ABSTRACT

The invention concerns a process for optimal operation of a slurry bubble column containing a suspension of solid particles in a liquid, characterized in that a gas phase containing the reactant(s) required for the production of the desired products is injected in the form of bubbles close to the lower extremity of the reactor and at least a portion of the liquid fraction and optionally of the solid fraction of the suspension is recirculated, drawn off from close to one extremity of the reactor and reintroduced close to the other extremity of the reactor, with a liquid flow rate $U_l$ in the reactor which is at least equal to and preferably greater than the sedimentation rate $U_s$ of the solid particles. The invention also concerns an apparatus for optimal operation of the process. Finally, the invention concerns the use of the process and apparatus in the Fischer-Tropsch synthesis.

19 Claims, 2 Drawing Sheets

PROCESS AND APPARATUS FOR OPERATION OF A SLURRY BUBBLE COLUMN WITH APPLICATION TO THE FISCHER-TROPSCH SYNTHESIS

SUMMARY OF THE INVENTION

The present invention concerns a process for optimal operation of a slurry bubble column containing three phases, namely a liquid phase, a solid phase and a gas phase. In this type of column, particles are held in suspension in the liquid by introducing gas bubbles close to the lower portion of the column. The present invention also concerns an apparatus for operating the bubble column under the optimal conditions of the present process. It also concerns the application of this process and apparatus to the synthesis of essentially linear and saturated hydrocarbons, preferably containing at least 5 carbon atoms per molecule, by reduction of synthesis gas $CO—(CO_2)—H_2$, i.e., a mixture of carbon monoxide and hydrogen, and optionally carbon dioxide, using the Fischer-Tropsch process. More particularly, the present invention is applicable to exothermic reactions which occur at high temperature, for example above 100° C., normally above 150° C., and generally at an absolute pressure of more than 0.1 megapascals (MPa), normally above 0.5 MPa. Among these reactions are hydrogenations, aromatizations, hydrodesulphurization, hydrodenitrogenation, hydrotreatments, in particular the hydrotreatment of residues, and hydroformylation. Such reactions are described, for example, in the book by J. F. LePage published by Technip in 1987, entitled "Applied Heterogeneous Catalysis". The present invention is particularly applicable to hydrogenation reactions. The invention was developed for application to hydrogenation of carbon monoxide and is particularly suitable thereto; it constitutes the preferred field of application of the present invention.

Bubble columns comprise a liquid medium containing solid particles in suspension, the majority in general being catalytic particles, and comprise at least one means for introducing at least one gas phase of reactants by means of at least one distribution means which produces bubbles of gas generally of small diameter, namely (by way of indication) 0.5 to 20 mm in diameter. These gas bubbles rise in the column and the reactants are absorbed by the liquid and diffuse towards the catalyst, in contact with which the reactants are converted into gaseous and/or liquid products formed depending on the conditions of the reaction and the type of catalyst. The gaseous products comprising the unconverted gaseous reactants and the gaseous products formed during the reaction are collected close to the top of the column and the suspension containing the liquid which forms the suspension of catalyst and the liquid products formed during the reaction is recovered via a line located near the upper level of the suspension in the column. The solid particles are then separated from the liquid using any method which is known to the skilled person, for example filtering, to recover the liquid products formed during the reaction.

In the case of highly exothermic reactions such as the Fischer-Tropsch process, bubble columns used as a slurry reactor are generally preferred to reactors operating as a fixed bed reactor. In particular, this technique can produce better heat transfer coefficients, better temperature homogeneity and small pressure drops. However, this reactor technology has a major disadvantage which is known to the skilled person: the productivity of the catalyst is limited, in particular when the diameter of the reactor is increased or the linear velocity of the gases is increased.

The remainder of the description refers to hydrocarbon synthesis using the Fischer-Tropsch process, however this should not be considered to limit the application of the apparatus of the invention nor of the process for operating this apparatus.

Within the context of such hydrocarbon synthesis, the skilled person is aware of two different types of operation as described in numerous patents, in particular in European patents EP-B-0 450 861 and EP-B-0 450 860. These two types are, firstly, the use of continuous complete mixing reactors, or perfectly mixed reactors, and secondly, the use of piston flow reactors. The main difference between these two types is the concentration of the reactants which provide the driving force for the reaction. In the continuous complete mixing system, the concentration of the reactants is the same at all points in the reactor while in the piston system, the concentration of the reactants regularly reduces along the catalytic bed from the radical inlet to the reactor outlet and the rate of the reaction is obtained by integrating the velocity function from the inlet to the outlet.

In a hydrocarbon synthesis reaction, the rate of conversion of carbon monoxide and the selectivity towards the product depends on the partial pressure of the reactants, hydrogen and carbon monoxide, and in some cases of the products, for example the water in contact with the catalyst. The characteristics of the mixture in the reactor are thus very important for determination of catalyst performances. They mean that the composition of the gas phase at any particular point in the reactor can be determined.

The use of a bubble column to carry out a highly exothermic reaction such as hydrocarbon synthesis by catalytic reduction of carbon monoxide has a certain advantage as regards the elimination of heat by at least partial heat exchange with the liquid which suspends the solid particles of the catalyst.

In the prior art, as described for example in EP-B-0 450 860, it is specifically recommended that the catalyst be kept fluidized in the liquid. In that case, maintaining the particles in the fluidized state requires suitable control when introducing the gas bubbles and good distribution thereof in the reactor so as to avoid backmixing (of the solid and liquid fractions, induced by the gaseous fraction) and of settling out of the solid particles. However, if dispersion of the gas bubbles is too great, the reactor changes its mode of operation and approaches the mode of operation of a perfectly stirred reactor. Controlling the velocity of the gas with the reactor diameter, two parameters which affect gas bubble dispersion, is thus of vital importance.

The present invention concerns an apparatus and process which substantially improves the productivity of the catalyst used to carry out the reaction. We have discovered that expansion of the catalyst and the uniformity of its concentration can be improved and as a result the selectivity and productivity of the catalyst can be improved, and heat transfer facilitated, by recycling a portion of the suspension which is reintroduced close to one extremity of the column opposite to the extremity from which the suspension has been extracted from the column, thus inducing a liquid flow rate which reduces settling of the solid particles and backimixing.

The description in EP-B-0 450 860 dissuades the skilled person from recirculating the liquid as for mechanically assisted recirculation, this would require the addition of supplementary pumps and filters which would affect investment costs and operating costs and complicate the operation of the process.

We have discovered that the advantage of recirculation, in particular in terms of the gain in productivity, is sufficiently large in the case of mechanically assisted recirculation using pumps that such use can be envisaged, in contrast to that maintained in EP-B-0 450 860.

In its widest form, the present invention concerns an apparatus comprising a substantially vertical reactor containing a suspension of at least one solid at least partially formed by catalytic particles in at least one liquid comprising at least one means for introducing gas, generally in the form of bubbles, close to the lower extremity of said reactor, at least one means for extracting gas close to the upper extremity of said reactor, at least one means for extracting at least a portion of the suspension close to the highest level of the liquid fraction of said suspension in said reactor, said apparatus being characterized in that it comprises at least one means for recirculating at least a portion of the liquid fraction of said suspension and optionally of the solid fraction of said suspension to obtain a rate of circulation $U_l$ of the suspension in the reactor which is at least equal to and preferably greater than the rate of sedimentation $U_s$ of the solid particles.

Thus the apparatus of the present invention can comprise recycling the liquid fraction of the suspension which is essentially free of the solid fraction of the suspension. In this case the solid fraction is separated and at least a portion, preferably the major portion, can also be recycled, usually after reactivation of the catalyst particles. However, the separated solid fraction can also simply be partially, preferably as a major portion, stored or destroyed.

The apparatus of the present invention can also comprise recycling at least a portion, preferably the major portion, of the liquid and solid fractions of the suspension.

Recirculation can be internal or external (with respect to the reactor) and can be mechanically assisted (for example using a pump) or not mechanically assisted (recirculation induced by the difference in density between the suspension (slurry) aerated by the gas phase and the non aerated recirculated slurry). Mechanically unassisted recirculation is sometimes termed natural recirculation. The circulation flow rate $U_l$ of the suspension circulating in the reactor is preferably more than 0.5 cm/s and normally about 0.5 cm/s to about 20 m/s, preferably about 1 cm/s to about 10 m/s, more preferably about 1 cm/s to about 5 m/s.

In order to operate the bubble column with internal recirculation of the slurry, a draft tube 7 is inserted inside the bubble column (FIG. 1). In this case, circulation of the liquid is not mechanically assisted: it is simply induced by the difference in density existing between the slurry aerated by the gas phase and the non aerated slurry after disengaging the bubbles (airlift effect). For this type of operation, the gas can be distributed internally of or externally of the draft tube and heat exchange surfaces can be inserted inside and/or outside that cylinder to evacuate the heat of reaction.

External recirculation of slurry in a bubble column can be achieved in two ways, depending on whether the recirculation is natural (FIG. 2) or mechanically assisted (FIG. 3). In the case shown in FIG. 2, the recycle conduit has relatively large dimensions which are sufficient to ensure natural recirculation. As an example, this conduit would have a volume at least equal to at least a tenth of the volume of the reactor, preferably at least a quarter of this volume.

In a particular embodiment, the apparatus of the present invention comprises at least one heat exchanger located either inside the reactor or outside the reactor on the suspension recirculation conduit. In this embodiment, as shown in FIG. 2, this conduit comprises a shell of wider proportions which are preferably sufficient to allow a bank of heat exchange tubes to be placed in the shell. In the case shown in FIG. 3, showing mechanically assisted recirculation, the recirculation conduit comprises a heat exchanger.

In the case of naturally established external recirculation (airlift effect), the flow rate of the recirculated liquid depends not only on the difference in density between the aerated slurry and the recirculated slurry, but also on the total of the pressure drops in the installation. External slurry recirculation can be achieved using pumps. In this case, the flow rate of the recirculated liquid can be selected so as to optimize the performances of the reactor and can be co-current or counter-current to the gas. Preferably, a co-current of gas and liquid is used.

In the case of naturally established external recirculation, the engineering of the heat exchanger which can be located inside the bubble column and/or the recycle loop is thus very important: a heat exchanger design for which pressure drops are low can recirculate a very large quantity of slurry (between 1 and 80,000 m$^3$/h) and reach large liquid phase linear velocities (usually about 0.5 cm/s to 1 m/s).

In a particular embodiment, the reactor comprises at least one internal heat exchanger. The apparatus of the invention can advantageously comprise at least one heat exchanger internal to the reactor and at least one heat exchanger in the recirculation loop, either included in the reactor chamber in the case of an apparatus comprising a natural recirculation means inside the reactor, or external in other cases.

In all cases, this recirculation of slurry improves the productivity of the catalyst with respect to the conventional mode of operation which is well known to the skilled person which consists of operating with a stagnant liquid phase as shown in Example 2 below. The performances of a reactor operated as described in the present invention are greatly improved, probably for the following reasons: liquid convection reduces the amount of backmixing; the productivity of the catalyst increases; the catalyst suspension is more uniform; the heat transfer and mass transfer coefficients are improved.

The invention also concerns a process for optimal operation of a slurry bubble column containing a suspension of solid particles in a liquid, characterized in that a gas phase containing the reactant(s) required for production of the desired products is injected as bubbles close to the lower extremity of this reactor, and at least a portion, preferably the major portion, of the liquid fraction and optionally of the solid fraction of the suspension is recirculated, drawn off close to one extremity of the reactor and reintroduced close to the other extremity of the reactor with a liquid flow rate $U_l$ in the reactor which is at least equal to, preferably greater than the rate of sedimentation $U_s$ of the solid particles.

In one implementation, the process of the invention comprises recirculation of a portion, preferably the major portion, of the suspension, i.e., the solid and liquid fractions of the suspension.

The flow rate $U_l$ of the circulating suspension is preferably more than 0.5 cm/s, normally about 0.5 cm/s to about 20 m/s, preferably about 1 cm/s to about 10 m/s, and more preferably about 1 cm/s to about 5 m/s.

In the preferred implementation of the process of the present invention, which concerns the synthesis of hydrocarbons by reduction of carbon monoxide, the solid particles are at least partially particles of a catalyst which is well known to the skilled person for catalysis of this reaction. Any Fischer-Tropsch synthesis catalyst, preferably iron or cobalt based, can be used. Cobalt based catalysts are preferably used in which the cobalt is present in a sufficient quantity to be catalytically active in the Fischer-Tropsch synthesis. Normally, cobalt concentrations are at least about 3% by weight, preferably 5% to 45% by weight, and more preferably about 10% to 30% by weight with respect to the total catalyst weight.

The cobalt and optional promoter elements are dispersed on a support which generally comprises alumina, silica or titanium oxide, and can contain other oxides such as, for example, oxides of alkali metals, alkaline-earth metals or rare earth metals.

The catalyst can also contain another metal, which is either active as a Fischer-Tropsch catalyst, for example a metal from groups 6 to 8 of the periodic table such as ruthenium, or a promoter metal such as molybdenum, rhenium, hafnium, zirconium, cerium or uranium. The promoter metal(s) is (are) normally present in a proportion of at least 0.05:1 with respect to cobalt, preferably at least 0.1:1, and more preferably 0.1:1 to 1:1.

As an example, it is possible to use a catalyst containing cobalt, at least one additional element M selected from the group formed by molybdenum and tungsten and at least one additional element N selected from the group formed by elements from groups Ia, IIa, Ib, also ruthenium, palladium, uranium, praseodymium, neodymium, and cobalt. Elements M and N are dispersed on a support, and the catalyst is preferably prepared by gelling as described in French patent FR-A-2 677 992. It is also possible to use a catalyst prepared by gelling and containing cobalt, ruthenium, and copper, as described in U.S. Pat. No. 5,302,622. However, any catalyst which is known to the skilled person can also be used.

The catalyst is generally in the form of a finely calibrated powder normally having a diameter of about 10 to 700 $\mu$m, usually about 10 to 200 $\mu$m, and more generally about 20 to 100 $\mu$m. It is used in the presence of a gas phase and a liquid phase. In the case of Fischer-Tropsch synthesis, any inert liquid or effluent from the reaction may be suitable as the liquid phase. The liquid phase can, for example, be constituted by one or more hydrocarbons containing at least 5 carbon atoms per molecule.

Operation of the bubble column requires the control of variables other than temperature, pressure and the ratio of the synthesis gases. The liquid medium used to suspend the catalyst can thus in general be any material which is liquid at the operational temperatures and pressures, which keeps the catalyst in suspension, which is relatively or largely inert under the reaction conditions and which constitutes a good solvent for the reactants (such as carbon monoxide and hydrogen in the case of the Fischer-Tropsch synthesis). Examples of suitable materials for the Fischer-Tropsch synthesis are saturated paraffins or olefinic polymers with boiling points above about 140° C., preferably at least about 280° C. Further, suitable suspension media can be the paraffins produced by the Fischer-Tropsch reaction with any Fischer-Tropsch reaction catalyst, better again liquids which boil above a temperature of about 350° C., or still better at a temperature of 370° C. to 560° C. As the reaction progresses, the local paraffin, i.e., the paraffin produced by the process of the present invention, replaces the start-up material used and eventually, the suspension medium is preferably substantially completely local paraffin, for example at least 90%.

The solid charge, i.e., the volume of catalyst per volume of suspension or diluent, is up to 50% and is preferably in the range 5% to 40%.

The supply gas, which in the case of the Fischer-Tropsch synthesis is hydrogen and carbon monoxide, can be diluted with a certain quantity of another gas, i.e., normally less than about 30% by volume, preferably less than about 20% by volume, in particular nitrogen, methane or $CO_2$. The supply gas is normally introduced into the bottom of the reactor and bubbles through it to the top of the reactor. The use of higher levels of diluting gas not only limits the maximum quantity of products formed per total volume of gas guided through the reactor, but also necessitates expensive separation stages to eliminate the diluent from the reactants of importance. The flow rate of the supply gas is normally as high as possible, while avoiding foam formation which occurs when the gas bubbles are not released from the liquid. This results in stable operation when the gas contained in the suspension does not increase with time or only increases slowly. Foam formation occurs when the residence time of the gas increases with time. The gas charge can be defined as the fraction of gas in the three phase suspension mixture. Appropriate velocities for the gas are those which entrain suspension of the particles in the liquid medium and are normally more than about 1 cm/second.

The reaction conditions for hydrocarbon synthesis processes are generally well known. However, within the context of the present invention, temperatures can be from 150° C. to 380° C., preferably 180° C. to 350° C., more preferably 190° C. to 300° C. Pressures are normally more than about 0.5 MPa, preferably 0.5 to 5 MPa, more preferably about 1 to 4 MPa. Increasing the temperature generally increases productivity, all other things remaining equal. However, in the Fischer-Tropsch synthesis, selectivity towards methane tends to increase and the stability of the catalyst tends to decrease as the temperature increases. Thus in such a case, while conversion of CO increases, the yield of desirable products, for example $C_5^+$, preferably $C_{10}^+$, may not be as high as the temperature increases. The ratio of hydrogen to carbon monoxide can also vary widely. While the stoichiometric $H_2$:CO ratio for Fischer-Tropsch reactions is close to 2.1:1, the majority of processes carried out in suspension use relatively low $H_2$:CO ratios. As an example, U.S. Pat. No. 4,681,867 describes preferred operational ratios of hydrogen to carbon monoxide of 1:2 to 1:1.4. Suspension processes generally use $H_2$:CO ratios of less than 1.0 (included) and show either a lower catalyst activity, or mass transfer limitations for CO penetrating into the liquid phase. The present invention is not limited to such an $H_2$:CO ratio and, in fact, an $H_2$:CO ratio of the stoichiometric ratio or close thereto is preferred. Thus the $H_2$:CO ratios can be from 1:1 to 3:1, or preferably 1.2:1 to 2.5:1.

BRIEF DESCRIPTION OF THE DRAWINGS

In FIG. 1, a reactor R1 comprises a conduit 1 for introduction of gaseous reactant(s) into a gas bubble distributor D1, an outlet conduit 2 for gas formed during the reaction and residual gases which are not transformed during the reaction, and a conduit 3 for recovering a portion of the suspension. Reactor R1 comprises a heat exchanger E1 supplied by an exchange fluid via a line 4 which is recovered via a line 5. It comprises a draft tube 7 for circulating the suspension.

FIG. 2 shows a reactor with natural external circulation comprising a line 10 for recirculating the suspension. Line 10 opens into a chamber containing a heat exchanger Ec supplied with heat transfer fluid via a line 8. The heat transfer fluid is recovered after exchanging heat via a line 9. The cooled suspension leaves the heat exchange zone external to reactor R1 via a line 11 and is reintroduced into reactor R1.

FIG. 3 schematically illustrates the case of mechanically assisted circulation using a pump P1.

Figure 1:
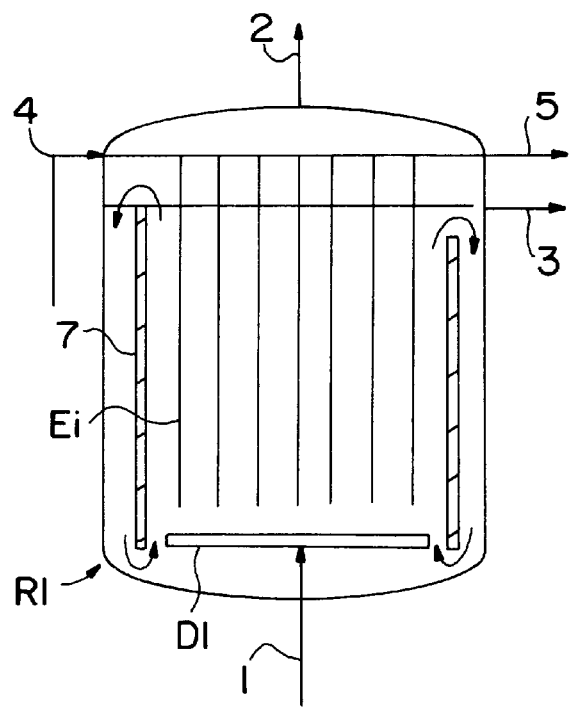
FIGS. 1 to 3 illustrate the invention. The same elements are given the same reference numerals.
Figure 2:
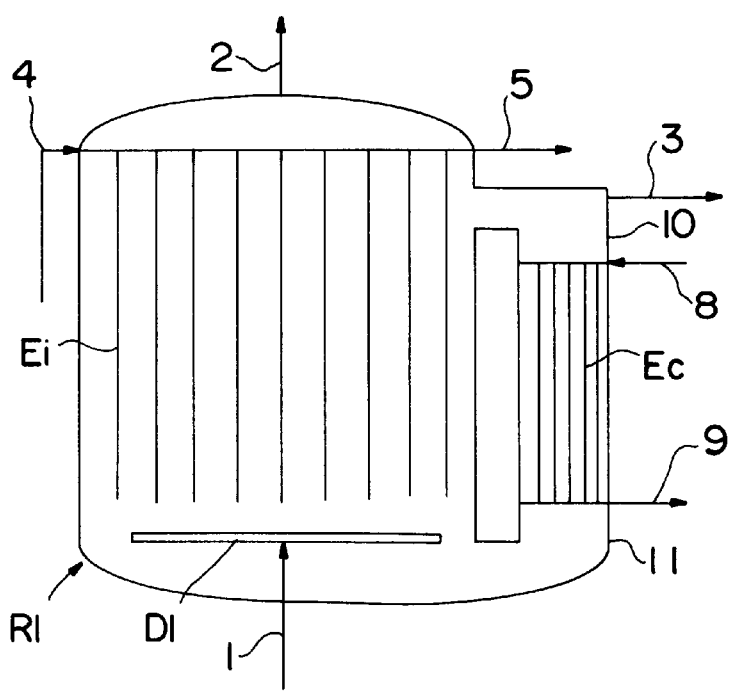
Figure 3:
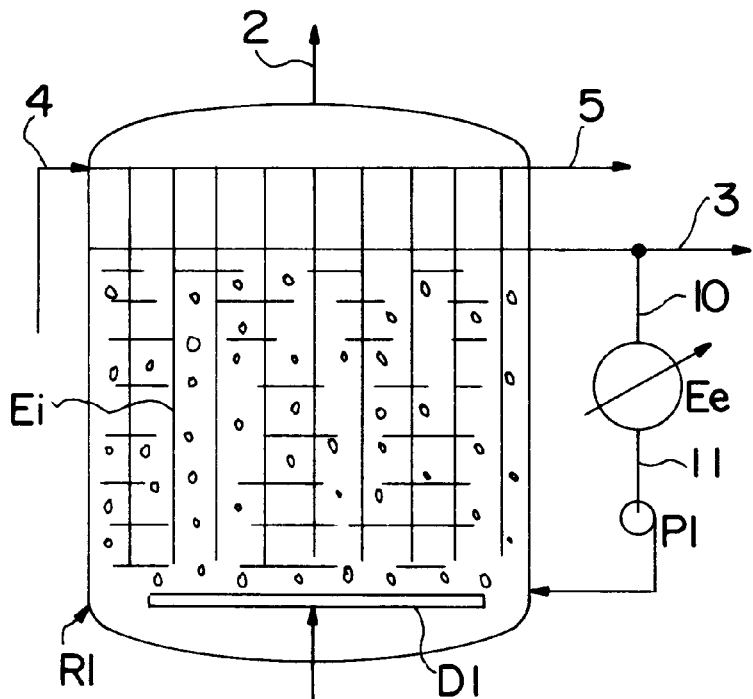

The following examples illustrate the invention without limiting its scope.

EXAMPLE 1

Slurry Reactor with Natural External Recirculation. Engineering of Heat Exchanger and Recirculation Flow Rate.

Reactor engineering software was specially developed for the design of a slurry reactor for the Fischer-Tropsch synthesis (see Example 2 for a detailed description of this model). Using this numerical model, we observed that in a reactor 5 meters in diameter and 15 meters high, we could achieve 91% conversion of a mixture of 27 T/h of synthesis gas. The heat to be evacuated was of the order of $32 \times 10^6$ kcal/h.

TABLE 1

| Reactor engineering | |
|---|---|
| Reactor dimensions | |
| Height | 15 meters |
| Diameter | 5 meters |
| Operating conditions | |
| Inlet temperature | 230° C. |
| Outlet temperature | 243° C. |
| Pressure | 30 bar |
| Superficial gas flow rate | 5 cm/s |
| Superficial liquid flow rate | 7.2 cm/s |
| Flow rate of recirculated liquid | 5100 m³/h |
| Characteristics of slurry | |
| Average degree of gas retention | 0.1 |
| Density of non aerated slurry | 680 kg/m³ |
| Density of aerated slurry | 612 kg/m³ |
| Airlift driving force | 0.100 bar |
| Performances | |
| Conversion | 91% |
| Reactor capacity | 84000 T/yr |
| Heat released by reaction | $32 \times 10^6$ kcal/h |
| Average degree of gas retention | 0.1 |

Table 1 summarises the operating conditions selected for the engineering of the reactor, also its performances. The difference in density between the aerated liquid phase and the recirculated liquid phase was 68 kg/m³, corresponding to an actuating driving force for the airlift of 0.1 bar (1 bar=0.1 MPa). There remained the engineering of a heat exchanger to evacuate all of the heat of reaction (i.e., $32 \times 10^6$ kcal/h) and for which the pressure drop was less than the actuating driving force, namely 0.1 bar.

TABLE 2

| Engineering of heat exchanger | |
|---|---|
| Description of tube bank | |
| Height | 15 meters |

TABLE 2-continued

| Engineering of heat exchanger | |
|---|---|
| Description of tube bank | |
| Tube diameter | 38 mm |
| Number of tubes | 1530 |
| Characteristics of cooling fluid | |
| Nature | water |
| Temperature | 190° C. |
| Pressure | 12.5 bar |
| Flow rate | 2500 T/h |
| Characteristics of effluent | |
| Shell inlet temperature | 243° C. |
| Shell outlet rare earth | 230° C. |
| Flow rate | 5100 m³/h |
| Pressure drop | 0.09 bar |

An exchanger with a height of 15 meters comprising 1530 tubes of 38 mm diameter can evacuate the he at of reaction for a liquid circulation of 5100 m³/h entering at 243° C. and leaving at 230° C. The pressure drop due to the exchanger was 0.09 bar, which was perfectly compatible with the ascending force linked to the difference in density between the column of aerated liquid in the reactor and the de-aerated column in the exchanger, which was 0.1 bar. These calculations show the feasibility of using the process.

EXAMPLE 2

Comparison of the Productivity of a Reactor Slurry Operating with Recirculation of the Liquid Phase with that of a Conventional Bubble Column of the Same Size, for the Fischer-Tropsch Synthesis— Case of an Isothermal Co-Current Reactor with an Upflow of Gas and Liquid This comparison was based on the numerical results obtained with a software engineering program for the reactor specially developed for the design of a slurry reactor for the Fischer-Tropsch synthesis. The model used for this study was an axial dispersion model, the equations for which were as follows:

$$-\frac{d}{dz}\left(\frac{\varepsilon_i \cdot D_i}{u_i} \cdot \frac{dF_j^i}{dz}\right) + \frac{dF_j^i}{dz} = \pm(k_L a)_i \cdot [C_j^* - C_j] + v_{ij} \cdot r$$

i: index representing the gas phase or the liquid phase;
j: index for the constituent for which the material balance is calculated (CO, $H_2$, $H_2O$);
$C_j$: concentration of j in the liquid phase;
$C_j^*$: concentration of j in the liquid phase at equilibrium;
r: rate of synthesis reaction;
$\varepsilon_i$: degree of retention of phase i;
$u_i$: superficial velocity in phase i;
$F_j^i$: molar flux of j in phase i;
$v_{ij}$: stoichiometric coefficient of constituent j in phase i for the Fischer-Tropsch synthesis reaction;
$(k_L a)_j$: gas-liquid mass transfer coefficient for compound j;
$D_i$: dispersion coefficient in liquid phase.

Using this numerical model, we calculated and compared the productivity of paraffins produced in a conventional industrial bubble column with that of a bubble column of the invention, provided with a draft tube. The bubble column had a height of 30 m and a diameter of 7 m.
Selected operating conditions:
Temperature: 240° C.;

Pressure: 30 bars;
Linear gas velocity: variable between 5–20 cm/s (see Table 3);
$H_2/CO=2.0$;
Catalyst based on cobalt on silica containing molybdenum and ruthenium as promoter.

TABLE 3

Figure 4:
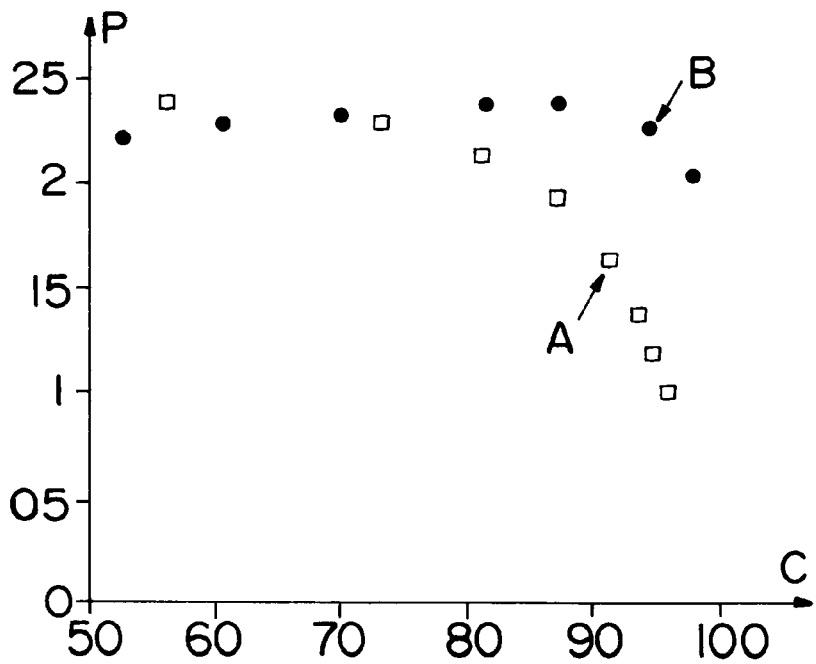
FIG. 4 is a graph of linear gas velocity versus conversion for a slurry reactor (A) and a conventional bubble column (B).

Linear velocity of gas and conversion obtained for each of the points shown in FIG. 4

| Reactor type | Linear gas velocity (cm/s) | Conversion (%) |
| --- | --- | --- |
| Conventional bubble reactor (no recirculation) | 5 | 95.8 |
| | 6 | 94.7 |
| | 7 | 93.5 |
| | 8.5 | 91.3 |
| | 10.5 | 87.3 |
| | 12.5 | 81.8 |
| | 15 | 73.4 |
| | 20 | 56.6 |
| Bubble column with internal liquid recirculation | 10 | 97.8 |
| | 11.5 | 94.6 |
| | 13 | 87.5 |
| | 14 | 81.4 |
| | 16 | 70 |
| | 18 | 60.5 |
| | 20 | 52.9 |

FIG. 4 shows the results obtained and compares the productivities of two types of reactor (slurry reactor, ● (case (a)) with internal liquid recirculation compared with a conventional bubble column, □ (case (b)), as a function of conversion. The productivity indicated, P, is a relative productivity, compared with the productivity of a conventional bubble column operating with 95.8% conversion.

For conversions of more than 70%, the productivity of the reactor with liquid recirculation was always higher than that of the conventional reactor. The observed gain in productivity can be more than 100% for conversions of close to 95%.

We claim:

1. An apparatus comprising:
   a substantially vertical reactor having an upper extremity and a lower extremity;
   said reactor containing an aerated suspension of at least one solid in at least one liquid, wherein, said at least one solid is at least partially formed by catalytic particles;
   said reactor comprising: a) at least one means for introducing gas close to the lower extremity of said reactor; b) at least one means for extracting gas close to the upper extremity of said reactor, c) at least one means for extracting at least a portion of the suspension; and
   said apparatus further comprising at least one means for recirculating at least a portion of non-aerated liquid fraction of said suspension to obtain a rate of circulation $U_l$ of the suspension in the reactor which is at least equal to the rate of sedimentation $U_s$ of the solid particles, wherein said means for recirculating provides natural recirculation induced by the difference in density between the aerated suspension and the recirculating non-aerated liquid portion.

2. An apparatus according to claim 1, wherein said means for recirculating is capable of recirculating at least a portion of said non-aerated liquid fraction which is essentially free of the solid fraction of said aerated suspension.

3. An apparatus according to claim 1, wherein said means for recirculating is capable of recirculating at least a portion of said non-aerated liquid and solid fractions of said aerated suspension.

4. An apparatus according to claim 2, in which the gas and the suspension circulate in a counter-current.

5. An apparatus according to claim 2, in which the gas and the suspension circulate in a co-current.

6. An apparatus according to claim 1 wherein said the means for recirculating the suspension is capable of producing a rate of circulation $U_l$ of said suspension in the reactor which is greater than the rate of sedimentation $U_s$ of said solid particles.

7. An apparatus according to claim 1, wherein said means for recirculating the suspension can produce a rate of circulation $U_l$ of the suspension in the reactor which is at least 0.5 cm/s.

8. An apparatus according to claim 1, wherein said means for recirculating is internal to said reactor.

9. An apparatus according to claim 1, wherein said means for recirculating is external to said reactor.

10. An apparatus according to claim 1 further comprising at least one heat exchanger.

11. An apparatus according to claim 10, wherein said heat exchanger is an exchanger which is internal to the reactor.

12. An apparatus according to claim 10, wherein said heat exchanger is an exchanger which is external to the reactor.

13. An apparatus according to claim 10, wherein said means for recirculating is a suspension recirculation loop having at least one heat exchanger.

14. Use of an apparatus according to claim 1 for carrying out exothermic reactions occurring at high temperatures of more than 100° C. at an absolute pressure of more than 0.1 MPa.

15. An apparatus according to claim 1, wherein $U_l$ is greater than $U_s$.

16. An apparatus according to claim 12, wherein said recirculating means comprises a suspension recirculation conduit and said heat exchanger is located in said suspension recirculation conduit.

17. An apparatus comprising:
   a substantially vertical reactor having an upper extremity and a lower extremity;
   said reactor containing an aerated suspension of at least one solid in at least one liquid, wherein, said at least one solid is at least partially formed by catalytic particles;
   said reactor comprising: a) at least one means for introducing gas close to the lower extremity of said reactor; b) at least one means for extracting gas close to the upper extremity of said reactor, c) at least one means for extracting at least a portion of the suspension; and
   said apparatus further comprising at least one means for recirculating at least a portion of non-aerated liquid fraction of said suspension to obtain a rate of circulation $U_l$ of the suspension in the reactor which is at least equal to the rate of sedimentation $U_s$ of the solid particles, wherein said means for recirculating provides mechanically-assisted recirculation.

18. An apparatus according to claim 12, wherein said apparatus further comprises a draft tube position within said reactor, and an internal heat exchanger positioned within said draft tube wherein said means for recirculating is the passageway defined by the outer surface of said draft tube and the wall of said reactor.

19. An apparatus according to claim 17, wherein said means for recirculating is provided by a suspension recirculation loop external to said reactor having at least one pump for mechanically-assisted recirculation and at least one heat exchanger.

* * * * *

UNITED STATES PATENT AND TRADEMARK OFFICE
CERTIFICATE OF CORRECTION

PATENT NO. : 5,961,933
DATED : October 5, 1999
INVENTOR(S) : Dominique Casanave, Villeurbanne; Pierre Galtier, Vienna;
Jean-Charles Viltard, Marly le Roi; all of France.

It is certified that error appears in the above-identified patent and that said Letters Patent is hereby corrected as shown below:

Title Page,
Item [73], left column, after "Institut Francais Du petrole, France" insert
-- Agip S.p.A., Italy and Agip Petroli S.p.A., Italy --.

Signed and Sealed this

Thirty-first Day of July, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,961,933
DATED : October 5, 1999
INVENTOR(S) : Dominique Casanave et al.

It is certified that error appears in the above-identified patent and that said Letters Patent is hereby corrected as shown below:

<u>Column 6,</u>
Line 54, change "linear gas velocity versus" to -- relative productivities as a function of --.
Lines 55-56, delete both lines and replace with -- for a conventional bubble column (case (A)) and a slurry reactor with internal liquid recirculation (case (B)). --

<u>Column 9,</u>
Line 29, change "(a))" to -- (B)) --.
Line 30, change "(case (b))" to -- (case (A))) --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*